United States Patent Office 2,820,741
Patented Jan. 21, 1958

2,820,741

ALUMINUM ASPIRIN GRANULATION AND METHOD FOR MAKING

Clarence J. Endicott, Waukegan, Thomas A. Prickett, Waukegan Township, Lake County, and Albert A. Dallavis, Waukegan, Ill., assignors to Abbott Laboratories, North Chicago, Ill., a corporation of Illinois No Drawing. Application April 29, 1954
Serial No. 426,582

2 Claims. (Cl. 167—82)

This invention relates to an improved granulation, a new granulating agent and the method for preparing a new and improved granulation.

In the pharmaceutical and food industries it is a well-known fact that very few crystalline or powdered materials can be compressed into suitable tablets on automatic tableting equipment in their crystalline or powdered form. The practice has developed of first preparing a granulation of the material because it is known that the grain-like structure thus formed is suitable for compression into tablets. The process of preparing a granulation according to the well-known methods consists of moistening the dry powder, with or without the addition of an adhesive substance until the whole is converted into a crumbly mass. The mass is then forced through a screen in order to reduce the material to a grain-like structure of small granules. The most commonly used moistening agent is, of course, water although solvents are well known for this purpose. It is also common practice to add a substance such as gelatin, starch and acacia in order to assist in granulating the material.

Many highly useful materials are very difficult to granulate because they are unstable in the presence of water. The granulation which has been moistened with water also requires a considerable amount of time in order to dry it to a point suitable for further processing. Although many materials such as resins, zein, and similar substances can be used as granulating agents with volatile solvents, most of them have the disadvantage of being water insoluble, off colored, or chemically active and are not considered wholly satisfactory to the art.

It is, therefore, a principal object of this invention to provide a new and novel method of forming a granulation which will be free from the defects of the prior art methods.

Another object of the invention is to provide a new and novel granulating agent which is soluble in water and in most organic solvents and which is chemically inert.

A further object of the invention is to provide a novel granulation which dries quickly to a hard material.

In the accomplishment of the foregoing objects and in accordance with the practice of the present invention it has now been found that very desirable granulations may be made from the usual ingredients by the addition thereto of a relatively small but significant amount of polyvinylpyrrolidone as the granulating agent. This chemical has a well established background of low toxicity in the pharmaceutical field and it is readily aavilable in the form of a slightly off-white solid and also in the form of solutions. Polyvinylpyrrolidone is a synthetic water-soluble polymer described in U. S. Patent No. 2,265,450.

Polyvinylpyrrolidone is substituted for other granulating agents such as starch and acacia in the usual granulating procedure. Since it is water soluble it can be used in any of the more commonly known granulations and because of its solubility in solvents, it is also highly desirable for use in the preparation of granulations which must be made free from contact with water. Many important medicinal substances and foods are highly hygroscopic and these materials can now be very satisfactorily formed into a granulation by the use of a water-free solvent solution of polyvinylpyrrolidone as the granulating agent.

Polyvinylpyrrolidone has some of the properties of a surface active agent so that it aids in the disintegration of a granule or of a compressed tablet made from a granulation containing polyvinylpyrrolidone. In fact all or part of the commonly used disintegrator can be replaced with polyvinylpyrrolidone, which is used in smaller amounts than ordinary disintegrators. It is chemically inert so that it can be used without danger in the presence of vulnerable medicaments such as vitamins and minerals. The use of a non-aqueous polyvinylpyrrolidone granulating agent also makes it possible to combine various ingredients which are normally incompatible when moistened with water.

The use of polyvinylpyrrolidone as a granulating agent is readily adaptable to the tablet-making function and it provides hard granules which can be compressed into hard tablets with standard equipment. For example, certain of the vitamins tend to form soft granulations and soft tablets when made up in the ordinary way. These soft tablets are subject to high incidence of breakage and to abrasion during the coating process. The same materials granulated with polyvinylpyrrolidone as the granulating agent form hard granules and hard tablets which are subject to much less breakage during coating. Again, the granulation made with polyvinylpyrrolidone is easier to dry because the amount of water or solvent employed is smaller. Finally, the tablet made by compressing a granulation prepared with polyvinylpyrrolidone can be of smaller size because very dilute aqueous or solvent solutions of polyvinylpyrrolidone are suitable. By comparison, it has been necessary to use much more concentrated solutions of starch and acacia, and larger amounts of diluents and disintegrators have formerly been required. The smaller size of the tablet made from a polyvinylpyrrolidone granulation is a highly significant factor in the tablet industry. For example in one representative product containing 100 mg. of activity and made up with starch as the granulating agent, 10 tablets weighed 33 grains. When polyvinylpyrrolidone was used it was possible to reduce the size of the tablet until 10 tablets weighed only 20.37 grains—a reduction of about 37%.

The amount of polyvinylpyrrolidone that is used in the preparation of a granulation in accordance with the practice of this invention may be varied widely to suit the individual situation. Amounts as little as 0.5% of polyvinylpyrrolidone based on the weight of the other dry ingredients of the granulation will give a product having the desirable qualities previously indicated. Because of the inert and non-toxic nature of polyvinylpyrrolidone there is no danger in using larger amounts and the upper limit is governed only by economics and by the size of the tablet made from the granulation. For example, in one representative multiple vitamin preparation that was notorious for its soft and weak structure, the new preparation containing about .4% by weight of polyvinylpyrrolidone based on the dry weight of the other ingredients of the granulation resulted in hard granules which made up into a hard and strong tablet in the usual tableting operation.

In another representative vitamin formula which was notorious for the softness of the tablet and for high incidence of breakage, polyvinylpyrrolidone was substituted for other granulating agents and the preparation which contained about 1.5% by weight of polyvinylpyrrolidone based on the dry weight of the other ingredients gave a hard granule which made up into a hard tablet and significantly lowered the breakage. And still another representative multiple vitamin preparation about 6% by weight of polyvinylpyrrolidone was employed based on the weight of the other dry ingredients in making up the granulation. In every instance the substitution of polyvinylpyrrolidone as the granulating agent greatly improved the physical properties of the granulation and of the tablets made therefrom and reduced the disintegration time of the tablet and the size thereof.

As previously noted the polyvinylpyrrolidone may be added in the form of either aqueous or solvent solution. Alternatively dry polyvinylpyrrolidone may be added to other ingredients which are moist from water or solvent in the making up of a granulation. Also, polyvinylpyrrolidone may be added in dry form to a partially dry but hygroscopic material of the type represented, for example, by a "dried" liver extract. Still another method involves adding dry polyvinylpyrrolidone to other dry ingredients and wetting down the mixture with water or solvent. While the theory is not fully understood it is thought that polyvinylpyrrolidone derives enough water or solvent from the other ingredients to render it effective as a granulating agent.

The following examples will serve to illustrate the invention in greater detail but it will be understood that the examples are not intended in any way as a limitation on the invention.

*Example I*

The following dry ingredients are thoroughly blended and wet with water, massed, screened and dried:

| | Lb. |
|---|---|
| Cyclohexylsulfamic acid | 1.0 |
| Polyvinylpyrrolidone | 0.02 |

Then 0.23 lb. of calcium carbonate is blended in and the mixture is compressed. The tablets thus prepared were found to be much harder and stronger than tablets made in a similar manner but without polyvinylpyrrolidone.

*Example II*

A granulation suitable for use in making a large quantity of tablets is prepared according to the following directions:

| | Lbs. |
|---|---|
| Erythromycin stearate | 135 |
| Sodium citrate anhydrous | 81 |
| Polyvinylpyrrolidone | 3.15 |
| Alcohol 3A | 31.50 |

Dissolve the polyvinylpyrrolidone in the alcohol and add with mixing to the dry blend of erythromycin stearate and sodium citrate anhydrous. After massing, force the massed material through a 4-mesh screen and dry for 24 hours at 120° F. The hard dry granules have a total weight of 220 lbs. and they contain approximately 1.43% by weight of polyvinylpyrrolidone.

Suitable lubricants may be blended with the granulation and the tablets may be compressed therefrom.

*Example III*

A granulation suitable for further working up into tablets is prepared according to the following directions.

| | Lbs. |
|---|---|
| Erythromycin stearate | 131 |
| Sulfadiazine sodium | 125.82 |
| Sulfamerazine sodium | 125.28 |
| Sulfamethazine | 115.63 |
| Aluminum hydroxide U. S. P. gel (dry) | 142.19 |
| Polyvinylpyrrolidone | 4.39 |
| Alcohol 3A anyhdrous | 140.40 |

The erythromycin stearate, the three sulfas and the aluminum hydroxide gel are charged into a mixer and thoroughly mixed with the addition of the polyvinylpyrrolidone in alcohol until the mixture is massed. The mass is then passed into a rotary granulator and the granulation is dried at about 120° F. This granulation contains about 0.68% by weight of polyvinylpyrrolidone.

Lubricants are blended with the granulation and hard tablets are compressed therefrom.

*Example IV*

A granulation was prepared according to the following directions:

| | Lbs. |
|---|---|
| Ox bile (dried and purified) | 9.96 |
| Dehydrocholic acid | 12.00 |
| Magnesium oxide | 0.46 |
| Polyvinylpyrrolidone | .50 |
| Alcohol 3A | .3 |
| Acetone | 10 |
| Talc | 0.68 |
| Stearic acid | 0.45 |

Charge the ox bile, dehydrocholic acid and magnesium oxide into a mass mixer and add the polyvinylpyrrolidone solution to the mix. Granulate through a ¼"-mesh screen and dry at 120° F. to less than 2% moisture. Grind to 12-mesh and blend in the talc and stearic acid. Compress into tablets.

*Example V*

Another interesting use of polyvinylpyrrolidone is in densifying a light, fluffy powder mixture which is adapted for encapsulating. A suitable granulation is made up according to the following directions:

| | Lbs. |
|---|---|
| Aluminum aspirin | 14.64 |
| Acetophenetidin | 7.64 |
| Caffeine alcohol | 1.53 |
| Methapyrilene HCl | 1.72 |
| Talc | 0.25 |
| Alcohol 3A | 6.50 |
| Polyvinylpyrrolidone | 0.32 |

The ingredients are milled if necessary and then the caffeine, methapyrilene and talc are mixed and are charged into a mass mixer along with the aluminum aspirin and acetophenetidin. The dry mixture is wet with the solution of polyvinylpyrrolidone in alcohol and the material, after thorough mixing, is granulated through ¼"-mesh screen. It is dried at 120° C. and the material is ground to a suitably small size for filling into capsules.

In this example the polyvinylpyrrolidone is employed in concentration of about 1.3% by weight of the other dry ingredients in the composition. Aluminum aspirin is notoriously difficult to handle because of its extremely light and fluffy nature. By granulating it with polyvinylpyrrolidone, the material is densified and does not return to its fluffy state upon drying. It is, therefore, much more suitable for encapsulating.

The use of polyvinylpyrrolidone in granulations is also disclosed in a co-pending application of Endicott and Jones, Serial No. 389,477, filed October 30, 1953, and a co-pending application of Endicott and Dallavis, Serial No. 392,035, filed November 13, 1953, the latter now abandoned.

Others may practice the invention in any of the numerous ways which will be suggested to one skilled in the art. All such practice is considered to be covered by this invention provided it falls within the scope of the appended claims.

We claim:

1. A dense granular product suitable for encapsulating which comprises, normally light and fluffy aluminum aspirin powder and about 2% by weight of polyvinylpyrrolidone, based on the weight of aspirin.

2. The method of making a dense granular product suitable for encapsulating which comprises wetting normally light and fluffy aluminum aspirin powder with about 2% by weight of polyvinylpyrrolidone dissolved in alcohol, and drying said mixture.

References Cited in the file of this patent

UNITED STATES PATENTS

| | | |
|---|---|---|
| 2,671,749 | Schultz et al. | Mar. 9, 1954 |

FOREIGN PATENTS

| | | |
|---|---|---|
| 507,692 | Belgium | June 9, 1952 |

OTHER REFERENCES

Drug Trade News, vol. 28, No. 14, July 6, 1953, pp. 43 and 64.

PVP—Gen. An. and Film Corp., Mar. 1951, N. Y., p. 47.